(12) United States Patent
Freeman et al.

(10) Patent No.: US 10,787,917 B2
(45) Date of Patent: Sep. 29, 2020

(54) MULTI-PIECE TURBINE DISK FOR CERAMIC MATRIX COMPOSITE COMPONENTS

(71) Applicants: Rolls-Royce North American Technologies Inc., Indianapolis, IN (US); Rolls-Royce High Temperature Composites Inc., Cypress, CA (US)

(72) Inventors: Ted J. Freeman, Danville, IN (US); Christopher Barrett, Huntington Beach, CA (US)

(73) Assignees: Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 148 days.

(21) Appl. No.: 15/971,356

(22) Filed: May 4, 2018

(65) Prior Publication Data

US 2019/0338657 A1    Nov. 7, 2019

(51) Int. Cl.
*F01D 5/30* (2006.01)

(52) U.S. Cl.
CPC ......... *F01D 5/3069* (2013.01); *F01D 5/3084* (2013.01); *F05D 2230/60* (2013.01); *F05D 2240/24* (2013.01); *F05D 2260/30* (2013.01); *F05D 2300/6033* (2013.01)

(58) Field of Classification Search
CPC .................................................... F01D 5/3069
See application file for complete search history.

(56) References Cited

U.S. PATENT DOCUMENTS

| | | | | |
|---|---|---|---|---|
| 752,340 | A | * 2/1904 | Holzwarth | F04D 29/326 416/189 |
| 1,876,067 | A | * 9/1932 | Lorenzen | F01D 5/225 415/173.6 |
| 2,401,826 | A | * 6/1946 | Halford | F01D 5/021 416/97 R |
| 2,819,869 | A | * 1/1958 | Meyer, Jr. | F01D 5/3069 416/131 |
| 3,937,593 | A | 2/1976 | Jeyes et al. | |
| 3,982,852 | A | 9/1976 | Andersen et al. | |
| 4,097,194 | A | 6/1978 | Barack et al. | |
| 4,270,256 | A | * 6/1981 | Ewing | B22F 5/04 228/191 |
| 5,197,857 | A | 3/1993 | Glynn et al. | |
| 5,961,287 | A | 10/1999 | Cairo | |
| 8,708,657 | B2 | 4/2014 | Bayley | |

* cited by examiner

*Primary Examiner* — Kenneth J Hansen
*Assistant Examiner* — Brian O Peters
(74) *Attorney, Agent, or Firm* — Barnes & Thornburg LLP

(57) ABSTRACT

A multi-piece disk for use in a turbine of a gas turbine engine. The multi-piece disk includes a fore disk segment and an aft disk segment coupled with the fore disk segment for movement with the fore disk segment. The fore disk segment and the aft disk segment are formed to define slots that extend through the disk segments and are configured to receive turbine blades therein.

17 Claims, 5 Drawing Sheets

MULTI-PIECE TURBINE DISK FOR CERAMIC MATRIX COMPOSITE COMPONENTS

FIELD OF THE DISCLOSURE

The present disclosure relates generally to gas turbine engine, and more specifically to disks for use in a turbine section of a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. In some turbine wheels, the blades are made from ceramic matrix composite materials configured to withstand high temperatures. Coupling the ceramic matrix composite blades with the disks may present design challenges.

SUMMARY

The present disclosure may comprise one or more of the following features and combinations thereof.

A turbine wheel for a gas turbine engine includes a fore disk segment, an aft disk segment, and a turbine blade. The fore disk segment includes a fore body arranged around an axis, a first fore lug, and a second fore lug. The first fore lug extends radially outward away from the fore body and the second fore lug extends radially outward away from the fore body. The first fore lug is spaced apart circumferentially from the second fore lug to define an axially extending fore slot between the first fore lug and the second fore lug.

The aft disk segment includes an aft body arranged around the axis, a first aft lug, and a second aft lug. The first aft lug extends radially outward away from the aft body and the second aft lug extends radially outward away from the aft body. The first aft lug is spaced apart circumferentially from the second aft lug to define an axially extending aft slot between the first aft lug and the second aft lug.

The turbine blade may comprise ceramic matrix composite materials. The turbine blade includes a root and an airfoil. The root is located in the axially extending fore slot and the axially extending aft slot. The airfoil extends radially outward away from the root. The first fore lug, the second fore lug, the first aft lug, and the second aft lug are shaped to block axial, circumferential, and radial movement of the root of the turbine blade out of the axially extending fore slot and the axially extending aft slot.

In some embodiments, the first fore lug includes a side surface that defines at least a portion of the axially extending fore slot. The side surface of the first fore lug may tapper radially outward away from the second fore lug as the side surface of the first fore lug extends axially aft toward the aft disk segment.

In some embodiments, the side surface included in the first fore lug extends circumferentially away from the second fore lug as the side surface of the first for lug extends axially aft toward the aft disk segment. In some embodiments, the axially extending fore slot extends axially through the entire fore disk segment.

In some embodiments, the first aft lug includes a side surface that defines at least a portion of the axially extending aft slot. The side surface may tapper at least one of radially and circumferentially as the side surface extends axially forward toward the fore disk segment.

In some embodiments, the fore body includes a fore hub and a fore web that extends circumferentially around the fore hub. The aft body includes an aft hub and an aft web that extends circumferentially around the aft hub. The fore disk segment may include a plurality of radially extending vanes that extend aft away from the fore web toward the aft disk segment.

In some embodiments, the aft disk segment further includes a plurality of radially extending vanes. The radially extending vanes may extend axially forward away from the aft web toward the fore disk segment.

In some embodiments, the fore body includes a fore hub and a fore web that extends circumferentially around the fore hub. The aft body includes an aft hub and an aft web that extends circumferentially around the aft hub. The turbine wheel may include a rigid annular spacer ring located axially between the fore hub and the aft hub.

In some embodiments, the fore body includes a fore hub and a fore web that extends circumferentially around the fore hub. The aft body includes an aft hub and an aft web that extends circumferentially around the aft hub. The fore hub is spaced apart axially from the aft hub. The first fore lug may be engaged with the first aft lug and the fore hub may be fastened to the aft hub.

In some embodiments, the root of the turbine blade includes an attachment surface that tappers radially as the attachment surface extends axially. In some embodiments, the first fore lug is coupled with the fore body along a bond line. In some embodiments, the first fore lug, the second fore lug, the first aft lug, and the second aft lug include outer radial surfaces that extend around the airfoil of the turbine blade to provide a platform around the turbine blade.

According to another aspect of the present disclosure, a method may include a number of steps. The method may include providing a turbine blade and a multi-piece disk having a fore disk segment and an aft disk segment, the turbine blade including a root and an airfoil that extends outward away from the root, the fore disk segment formed to include a plurality of fore slots, and the aft disk segment formed to include a plurality of aft slots, aligning the root of the turbine blade with a first fore slot included in the plurality of fore slots, moving the fore disk segment and the turbine blade axially relative to one another until the turbine blade is blocked from further axial movement by the fore disk segment to locate the root of the turbine blade in the first fore slot, aligning the root of the turbine blade with a first aft slot included in the plurality of aft slots, and moving the aft disk segment and the turbine blade axially relative to one another until the turbine blade is blocked from further axial movement by the aft disk segment to locate the root of the turbine blade in the first aft slot.

In some embodiments, the fore disk segment includes a fore hub arranged around an axis, a fore web, and a plurality of fore lugs. The fore web is arranged circumferentially around the fore hub. The plurality of fore lugs extends radially away from the fore web. The aft disk segment includes an aft hub arranged around the axis, an aft web, and a plurality of aft lugs. The aft web is arranged circumferentially around the aft hub. The plurality of aft lugs extends radially away from the aft web. The method may include pressing the fore hub and the aft hub axially to reduce a size of a gap between the fore hub and the aft hub while blocking axial movement of the plurality of fore lugs and the plurality of aft lugs. In some embodiments, the method includes blocking the fore hub and the aft hub from moving axially away from one another after pressing the fore hub and the aft hub.

In some embodiments, the fore disk segment includes a fore hub arranged around an axis and a fore web arranged circumferentially around the fore hub. The method may include bonding a plurality of fore lugs to the fore web to define the plurality of fore slots.

In some embodiments, the method includes applying a compressive force to the root of the turbine blade with the fore disk segment and the aft disk segment. In some embodiments, the fore disk segment includes a fore hub arranged around an axis, a fore web arranged circumferentially around the fore hub, and a plurality of fore lugs that extend radially away from the fore web. The fore web may be formed to include a plurality of vanes that extend aft toward the aft disk segment. The method may include rotating the fore disk segment to cause the plurality of vanes to move air radially outward toward the turbine blade.

In some embodiments, the method includes directing hot combustion gasses directly over outer radial surfaces of the fore disk segment and the aft disk segment. In some embodiments, the method includes locating a rigid spacer axially between the fore disk segment and the aft disk segment.

These and other features of the present disclosure will become more apparent from the following description of the illustrative embodiments.

DETAILED DESCRIPTION OF THE DRAWINGS

Figure 1:
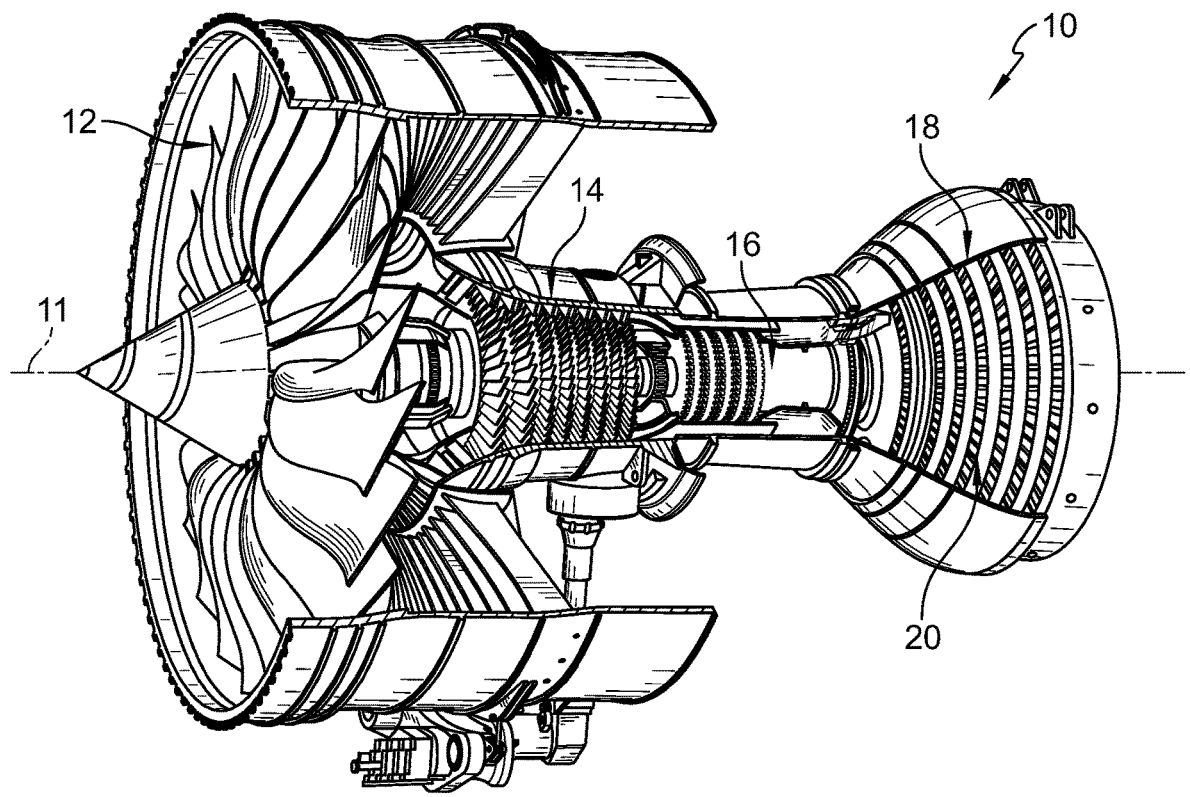
FIG. 1 is cutaway view of a gas turbine engine that includes a fan, a compressor, a combustor, and a turbine and the turbine includes a plurality of turbine wheels in accordance with the present disclosure and shown with further details in FIG. 2.

For the purposes of promoting an understanding of the principles of the disclosure, reference will now be made to a number of illustrative embodiments illustrated in the drawings and specific language will be used to describe the same.

Figure 2:
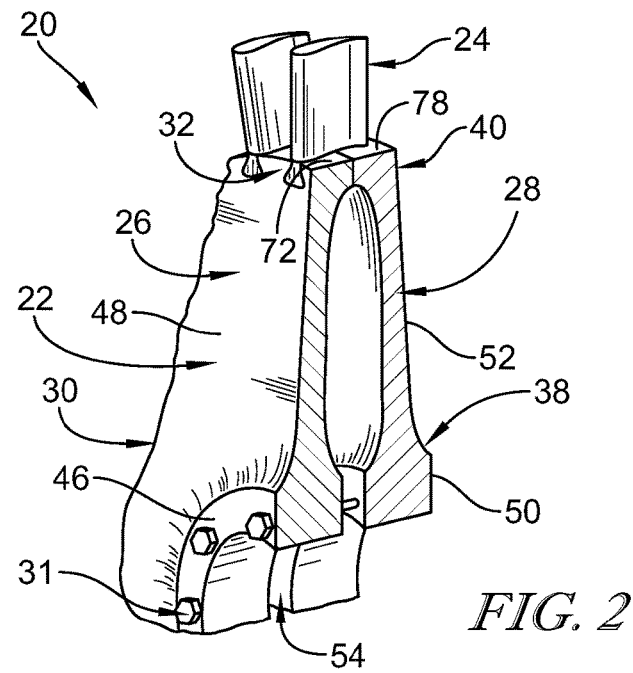
FIG. 2 is a perspective and section view of one of the turbine wheels of FIG. 1 showing that the turbine wheel includes a multi-piece disk having a fore disk segment and an aft disk segment and a plurality of turbine blades located between the fore and aft disk segments and arranged circumferentially about the multi-piece disk.

A turbine wheel 20 in accordance with the present disclosure is shown in FIG. 2 and is adapted for use in an illustrative gas turbine 10 as suggested in FIG. 1. As show in FIGS. 2-4, the turbine wheel 20 includes a multi-piece disk 22 and a plurality of turbine blades 24 that extend radially outward away from the multi-piece disk 22 relative to a central axis 11. The multi-piece disk 22 includes a fore disk segment 26 and an aft disk segment 28 that are coupled with one another to trap the plurality of turbine blades 24 between the fore disk segment 26 and the aft disk segment 28. As a result, the fore disk segment 26 and the aft disk segment 28 block the turbine blades 24 from separating from the multi-piece disk 22 in axial, circumferential, and radial directions.

Figure 3:
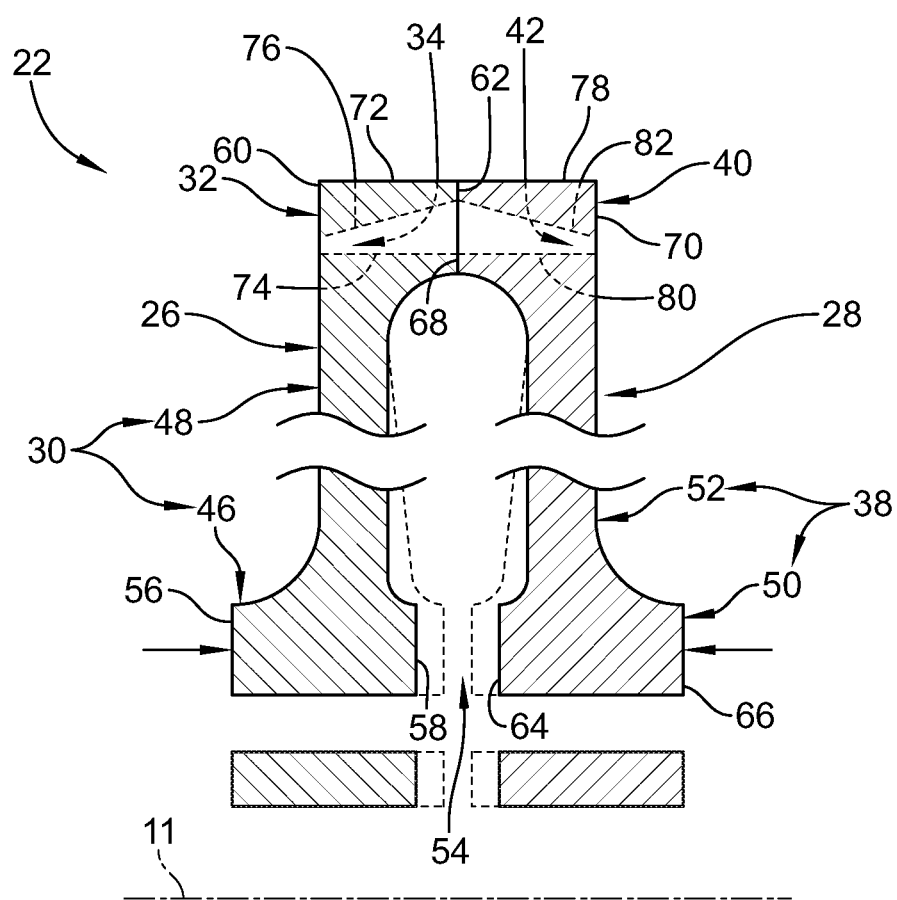
FIG. 3 is a section view of the multi-piece disk of FIG. 2 showing that the fore disk segment and the aft disk segment are formed to include slots that extend through the disk segments to receive one of the turbine blades and the slots are tapered to block the turbine blades from moving axially out of the slots.

The fore disk segment 26 includes a fore body 30 and a plurality of fore lugs 32 as shown in FIGS. 2 and 3. The fore body 30 is arranged around the central axis 11 and the plurality of fore lugs 32 extend radially outward away from the fore body 30 to define a plurality of axially extending fore slots 34 located between neighboring fore lugs 32. The aft disk segment 28 includes an aft body 38 and a plurality of aft lugs 40. The aft body 38 is arranged around the central axis 11 and the plurality of aft lugs 40 extend radially outward away from the aft body 38 to define a plurality of axially extending aft slots 42 located between neighboring aft lugs 40.

Each fore slot 34 is circumferentially aligned with a corresponding aft slot 42 and each turbine blade 24 is located in a corresponding fore slot 34 and aft slot 42 pair as shown in FIG. 2. The fore lugs 32 and the plurality of aft lugs 40 that defines the slots 34, 42 block axial, circumferential, and radial movement of roots 86 included in the of the plurality of turbine blades 24 out of the fore slots 34 and the aft slots 42 as suggested in FIGS. 2 and 3. In one embodiment, the fore lugs 32 and aft lugs 40 include surfaces that tapper toward each other as they extend axially as suggested in FIGS. 3 and 5 to block movement of the turbine blades 24.

The gas turbine engine 10 is designed to include the turbine wheel 20 and includes a fan 12, a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure gasses from the burning fuel are directed into the turbine 18 where the turbine blades 24 of the turbine 18 extract work to drive the compressor 14 and the fan 12. In other embodiments, the gas turbine engine 10 may include a shaft, turboprop, or gearbox in place of fan 12.

The turbine 18 includes a plurality of the turbine wheels 20 and a turbine shroud arranged around the turbine wheels 20 as suggested in FIG. 1. Each turbine wheel 20 includes a multi-piece disk 22 and a plurality of the turbine blades 24 as shown in FIG. 2. The multi-piece disk 22 is arranged to rotate about the central axis 11 during operation of the gas turbine engine 10 and may be coupled to a shaft of the gas turbine engine 10 for transmitting the rotational power to the compressor 14 or fan 12.

The plurality of turbine blades 24 extend radially away from the multi-piece disk 22 and interact with the hot combustion gasses to rotate the multi-piece disk 22 about the central axis 11. The turbine shroud is arranged around the turbine blades 24 to block the hot, high pressure gasses from flowing over tips of the turbine blades 24 because work is not extracted from gasses that flow over the turbine blades 24.

The multi-piece disk 22 includes the fore disk segment 26 and the aft disk segment 28 as shown in FIG. 3. The fore disk segment 26 and the aft disk segment 28 are annular and extend 360 degrees around the central axis 11. The fore disk segment 26 and the aft disk segment 28 are coupled together to trap the plurality of turbine blades 24 between the disk segments 26, 28.

In some embodiments, the fore disk segment 26 and the aft disk segment 28 are coupled together with fasteners. In the illustrative embodiment, the fore disk segment 26 and the aft disk segment 28 are coupled together with bolts 31 as shown in FIG. 2. The fore disk segment 26 and the aft disk segment 28 may be coupled together with a spline/tie bolt arrangement, bolts/nuts through the disk segments 26, 28, a cam lock feature with a tie bolt, and any other suitable alternative.

Figure 5:
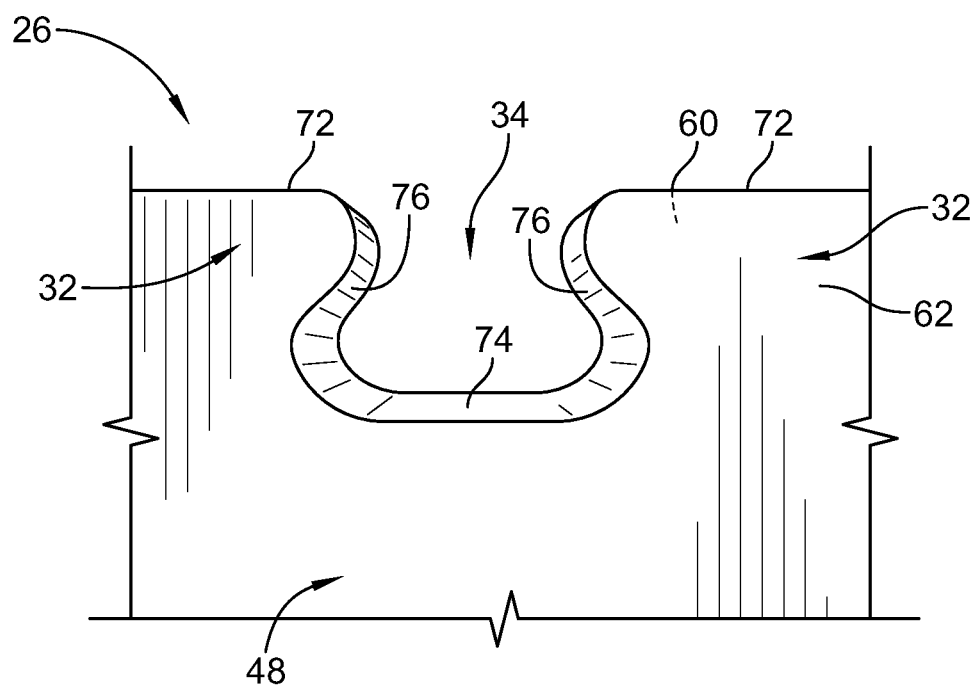
FIG. 5 is an elevation view of a portion of the fore disk segment showing a rear face of the fore disk segment and further showing that the slot walls tapper circumferentially toward one another as they extend axially forward.

The fore disk segment 26 includes the fore body 30 and the plurality of fore lugs 32 as shown in FIGS. 2, 3, and 5. The fore body 30 includes a fore hub 46 that is arranged around the central axis 11 and a fore web 48 that extends circumferentially around the fore hub 46. The fore hub 46 includes a front face 56 and a rear face 58 spaced apart axially from the front face 56 of the fore hub 46 as shown in FIG. 3. The plurality of fore lugs 32 extend radially outward away from the fore web 48 to define the plurality of axially extending fore slots 34 located between neighboring fore lugs 32 as shown in FIGS. 2, 3, and 5. The fore lugs 32 define front faces 60 and rear faces 62 spaced apart axially from the front faces 60 of the fore lugs 32 as shown in FIG. 3.

FIG. 5 is an elevation view of a rear face of the fore disk segment 26 and shows that the fore lugs 32 include an outer radial surface 72, inner radial surfaces 74, and side surfaces 76. The outer radial surface 72 defines an outermost surface of the fore disk segment 26. The inner radial surfaces 74 are located radially between the outer radial surface 72 and the central axis 11. The side surfaces 76 extend between and interconnect the outer radial surface 72 and the inner radial surfaces 74.

The inner radial surface 74 and the side surfaces 76 of neighboring fore lugs 32 cooperate to define one of the plurality of fore slots 34 as shown in FIG. 5. The inner radial surface 74 and the side surfaces 76 of neighboring fore lugs 32 are shaped to block radial and circumferential as well as axial movement of a turbine blade 24 out of the fore slot 34. In the illustrative embodiments, the roots 86 of the turbine blades 24 are shaped to cooperate with the side surfaces 76 of neighboring fore lugs 32 to block radial, circumferential, and axial movement of the turbine blades 24 out of the fore and aft slots 34, 42.

The inner radial surfaces 74 of the fore lugs 32 do not substantially change in radial distance relative to the central axis 11 as they extend axially as suggested by the linear and horizontal dotted line representing an inner radial surface 74 in FIG. 3. The side surfaces 76 tapper (extend) radially and/or circumferentially as the side surfaces 76 extend axially as suggested by the angled dotted line representing a side surface 76 in FIG. 3.

The side surfaces 76 of the fore lugs 32 tapper radially inward and circumferentially toward a neighboring side surface 76 as the side surface 76 extends axially forward from rear faces 62 toward front faces 60 as suggested in FIG. 5. Thus, the side surfaces 76 of the fore lugs 32 tapper radially outward and circumferentially away from a neighboring side surface 76 as the side surface 76 extends axially aft toward the aft disk segment 28. As a result, a turbine blade 24 is positioned in the fore slot 34 by sliding the turbine blade 24 from the rear faces 62 of the fore lugs 32 toward the front faces 60 of the fore lugs and the turbine blade 24 is blocked from moving axially out of the fore slot 34 in the fore direction by the tapered side surfaces 76 of the fore lugs 32. As described below, the aft lugs 40 block the turbine blade 24 from moving axially out of the aft slot 42 in the aft direction by tapered side surfaces 82.

The aft disk segment 28 includes the aft body 38 and the plurality of aft lugs 40 as shown in FIG. 3. The aft body 38 includes an aft hub 50 that is arranged around the central axis 11 and an aft web 52 that extends circumferentially around the aft hub 50. The aft hub 50 includes a front face 64 and a rear face 66 spaced apart axially from the front face 64 of the aft hub 50 as shown in FIG. 3. The plurality of aft lugs 40 extend radially outward away from the aft web 52 to define the plurality of axially extending aft slots 42 located between neighboring aft lugs 40. The aft lugs 40 define front faces 68 and rear faces 70 spaced apart axially from the front faces 68 of the aft lugs 40.

The aft lugs 40 include an outer radial surface 78, inner radial surfaces 80, and side surfaces 82 as shown in FIG. 3. The outer radial surface 78 of the aft lugs 40 defines an outermost surface of the aft disk segment 28. The inner radial surfaces 80 of the aft lugs 40 are located radially between the outer radial surface 78 and the central axis 11. The side surfaces 82 extend between and interconnect the outer radial surface 78 and the inner radial surfaces 80.

The inner radial surface 80 and the side surfaces 82 of neighboring aft lugs 40 cooperate to define one of the plurality of aft slots 42 as shown in FIG. 3. The inner radial surface 80 and the side surfaces 82 of neighboring aft lugs 40 are shaped to block radial and circumferential as well as axial movement of a turbine blade 24 out of the aft slot 42. In the illustrative embodiments, the roots 86 of the turbine blades 24 are shaped to cooperate with the side surfaces 82 of neighboring aft lugs 40 to block radial, circumferential, and axial movement of the turbine blades 24 out of the fore and aft slots 34, 42.

The inner radial surfaces 80 of the aft lugs 40 do not substantially change in radial distance relative to the central axis 11 as they extend axially as suggested by the linear and horizontal dotted line representing an inner radial surface 80 in FIG. 3. The side surfaces 82 tapper (extend) radially and/or circumferentially as the side surfaces 82 extend axially as suggested by the angled dotted line representing a side surface 82 in FIG. 3.

The side surfaces 82 of the aft lugs 40 tapper radially inward and circumferentially toward a neighboring side surface 82 as the side surfaces 82 extend axially aft from the front faces 68 to the rear faces 70 of the aft lugs 40 as suggested in FIG. 3. As a result, a turbine blade 24 is blocked from moving axially out of the aft slot 42 in the aft direction by the tapered side surfaces 82.

The fore disk segment 26 and the aft disk segments 28 may be compressed toward each other at the hubs 46, 50 during assembly as suggested in FIG. 3. The fore lugs 32 extend axially aft of the fore hub 46 such that the rear faces 62 of the fore lugs 32 are located axially aft of the rear face 58 of the fore hub 46 as shown in FIG. 3. The aft lugs 40 extend axially forward of the aft hub 50 such that the front faces 68 of the aft lugs 40 are located axially forward of the front face 64 of the aft hub 50. The turbine wheel 20 includes fastening means for blocking the fore hub 46 and the aft hub 50 from moving axially apart from one another after the fore hub 46 and the aft hub 50 have been compressed axially toward one another.

The rear faces 62 of the fore lugs 32 engage the front faces 68 of the aft lugs 40 as shown in FIG. 3. The rear face 58 of the fore hub 46 is spaced apart axially from the front face 64 of the aft hub 50 to form a gap 54. During assembly, the fore hub 46 and the aft hub 50 may be urged toward each other, as suggested by the solid arrows in FIG. 3, to cause the rear face 58 of the fore hub 46 and the front face 64 of the aft hub 50 to move toward one another as suggested by the dotted outline of the hubs 46, 50 and webs 48, 52 in FIG. 3.

The fore hub 46 and the aft hub 50 are maintained in the compressed arrangement and blocked from moving away from one another by fastening or clamping means. As a result, the fore disk segment 26 and the aft disk segment 28 are pre-compressed to manage the centripetal forces experienced during rotation of the turbine wheel 20. In some embodiments, the fore hub 46 and the aft hub 50 are compressed such that the rear face 58 of the fore hub 46 and the front face 64 of the aft hub 50 touch each other.

Figure 4:
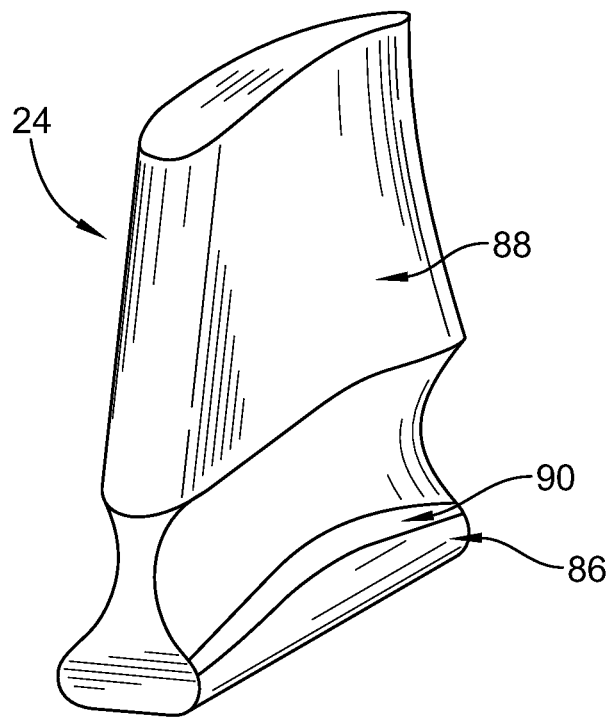
FIG. 4 is a perspective view of one of the plurality of turbine blades showing that the turbine blade includes a root configured to be received in the slots of the multi-piece disk and an airfoil that extends away from the root and the root includes a tapered surface configured to engage with the slot walls of the disk segments.

Each of the plurality of turbine blades 24 includes the root 86 and an airfoil 88 coupled to the root 86 as shown, for example, in FIG. 4. The root 86 is located in a fore slot 34 and aft slot 42 pair to couple the turbine blade 24 with the multi-piece disk 22 for movement with the multi-piece disk 22. The airfoil 88 extends radially outward away from the root 86 and is adapted to interact with the hot combustion gasses. A platform may extend around the airfoil 88 to discourage the hot gasses interacting with the airfoil 88 from moving radially inward toward the multi-piece disk 22. In the illustrative embodiment, the outer radial surfaces 72, 78 of the multi-piece disk 22 form the platform arranged around the turbine blades 24 as suggested in FIG. 2.

The root 86 of each turbine blade 24 is formed to cooperate with the fore slot 34 and the aft slot 42 so that the root 86 is blocked from moving axially forward or aft out of the fore slot 34 and the aft slot 42. In the illustrative embodiment, the root 86 includes an attachment surface 90 that has a curvature shaped to match the side surfaces 76, 82 of the fore lugs 32 and the aft lugs 40 as shown in FIG. 4.

The attachment surface 90 tappers circumferentially outward toward the side surfaces 76, 82 as the attachment surface 90 extends aft from a front end of the root 86 toward a midsection of the root 86. The attachment surface 90 then tappers circumferentially inward away from the side surfaces 76, 82 as the attachment surface 90 extends aft from the midsection of the root 86 toward an aft end of the root 86. In the illustrative embodiment, the root 86 is sized such that the fore lugs 32 and the aft lugs 40 apply a compressive force around the root 86 when the fore disk segment 26 and aft disk segment 28 are coupled together. This may eliminate any movement of the turbine blade 24 while the turbine wheel 20 is not rotating.

In illustrative embodiments, the turbine blades 24 comprise ceramic materials adapted to withstand the high temperature combustion gasses surrounding the turbine blades 24. In some embodiments, the turbine blades 24 are formed from metallic materials. In some embodiments, the blades are made from a metallic super alloy, ceramic matrix composite, or a monolithic ceramic.

Figure 6:
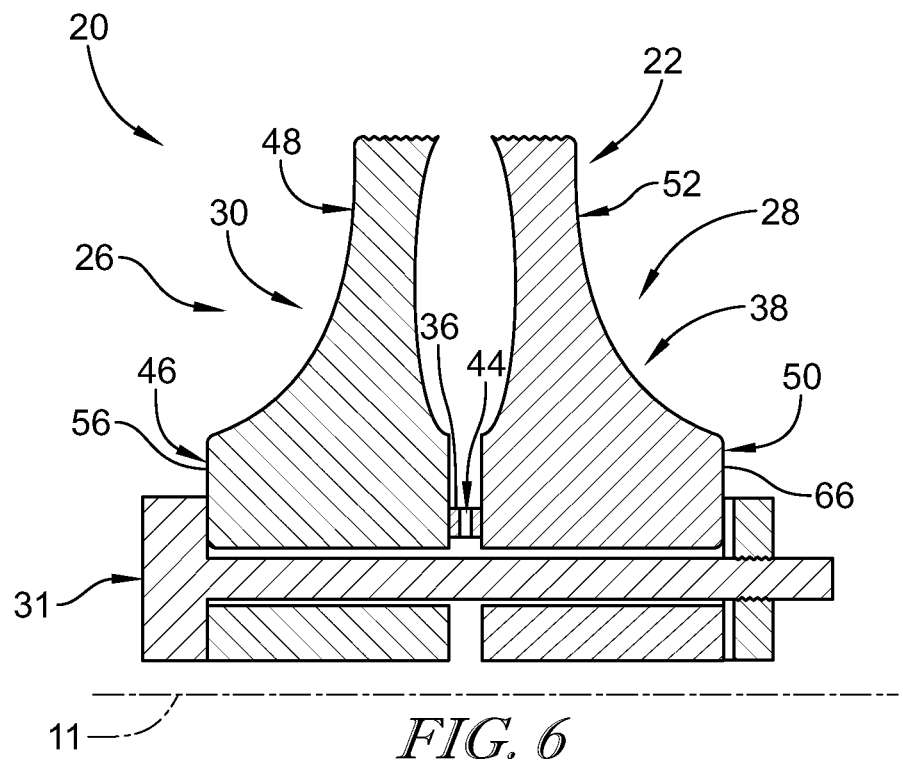
FIG. 6 is a section view of the multi-piece disk of FIG. 2 showing that a spacer is located between the fore disk segment and the aft disk segment and that a fastener extends through a hub region of the disk segments to couple the disk segments to each other.

In some embodiments, the multi-piece disk 22 further includes a rigid spacer 36 as shown in FIG. 6. The spacer 36 may be an annular ring that is positioned between the fore hub 46 and the aft hub 50 to limit axial movement of the fore hub 46 and the aft hub 50 toward one another. In some embodiments, the spacer 36 is formed to include radially extending passageways 44 that extend through the spacer 36 to allow cooling air to flow between the fore disk segment 26 and the aft disk segment 28. In some embodiments, the annular spacer 36 is completely solid without passageways.

Figure 7:
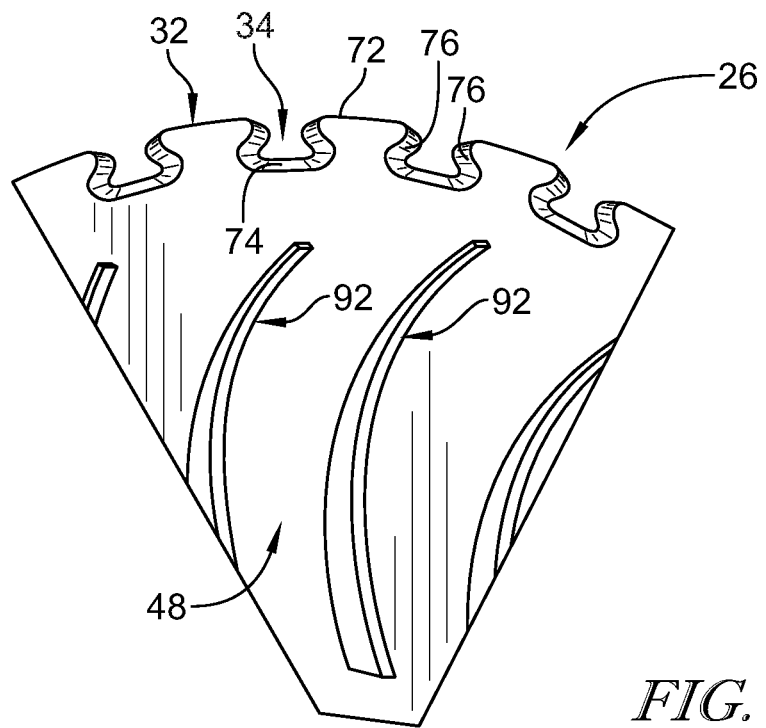
FIG. 7 is an elevation view of a portion of the aft disk segment included in the multi-piece disk showing that the aft disk includes a plurality of vanes that extend axially fore toward the fore disk segment for urging cooling air radially outward toward the turbine blades during use of the turbine disk.
Figure 8:
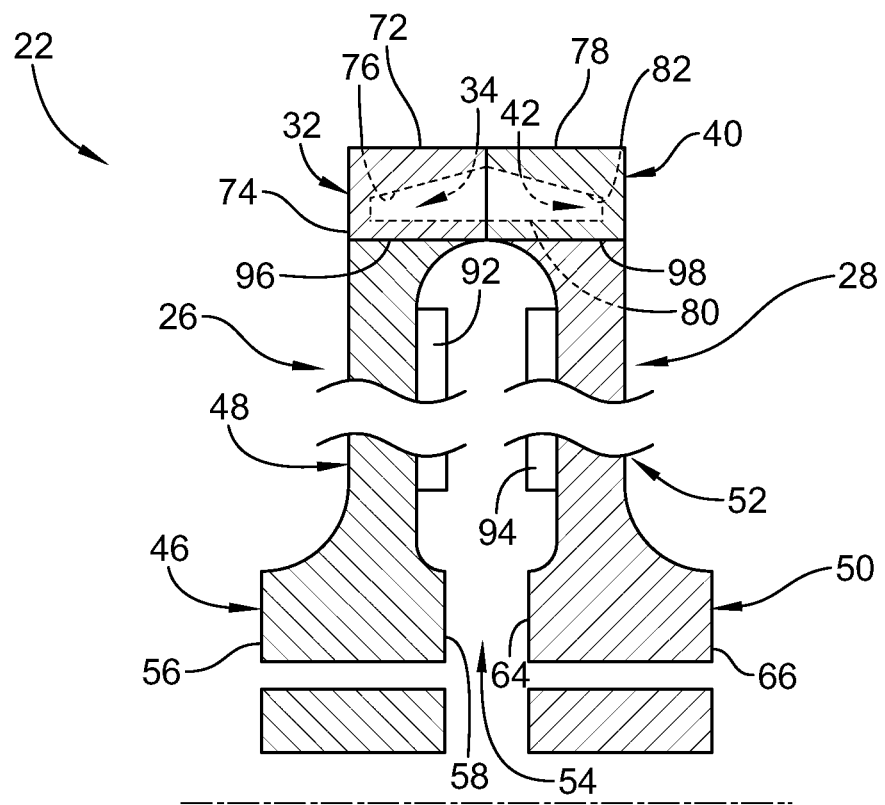
FIG. 8 is a section view of a multi-piece disk adapted for use with the turbine wheel of FIG. 1 showing that the fore disk segment and the aft disk segment are formed to include slots for receiving turbine blades and that the slots are bounded by a front face of the fore disk segment and a rear face of the aft disk segment.

In some embodiments, the fore disk segment 26 is formed to include curved vanes 92 that extend axially aft away from the fore web 48 toward the aft disk segment 28 as shown in FIG. 7. In some embodiments, the aft disk segment 28 is formed to include curved vanes 94 that extend axially forward away from the aft web 52 toward the fore disk segment 26 as shown in FIG. 8. The vanes 92, 94 are formed to urge cooling air toward the fore lugs 32 and the aft lugs 40 during operation of the turbine wheel 20.

In some embodiments, the fore slots 34 extend axially through the front faces 60 of the fore lugs 32 and the aft slots 42 extend axially through the rear faces 70 of the aft lugs 40 as shown in FIG. 3. In other embodiments, the fore slots 34 end axially before the front faces 60 of the fore lugs 32 and the aft slots 42 end axially before the rear faces 70 of the aft lugs 40 as shown in FIG. 8. As a result, the front faces 60 of the fore lugs 32 are continuous and the rear faces 70 of the aft lugs 40 are continuous.

The fore lugs 32 are integrally formed with the fore web 48 and the aft lugs 40 are integrally formed with the aft web 52 in the illustrative embodiment as shown in FIG. 3. In other embodiments, the fore lugs 32 are formed separate from the fore web 48 and are bonded with the fore web along bond line 96 as shown in FIG. 8. The aft lugs 40 are formed separate from the aft web 52 and are bonded with the aft web along bond line 98 as shown in FIG. 8. The fore lugs 32 and the aft lugs 40 may be formed from different materials than the webs 48, 52 in such embodiments.

Ceramic matrix composite (CMC) material may sustain higher temperatures when compared with traditional metal alloys. It may therefore be desirable in gas turbine engines to use ceramic matrix composite materials where higher fuel efficiencies may be reached with higher temperatures. A turbine section of an engine may be susceptible to high temperatures, so ceramic matrix composites may provide benefits in the turbine section. Additionally, ceramic matrix composite material may be less dense than metal. Thus, it may save weight on the engine, which can help fuel efficiency of the engine. This may be beneficial in a turbine blade because reducing the weight of a turbine blade may allow for a weight reduction in the turbine wheel.

The present disclosure provides a twin disk 22 for use in the gas turbine engine 10 and the disk 22 is designed to hold a ceramic matrix composite blade 24 (although it could also hold a metallic blade) as suggested in FIGS. 1 and 2. In some embodiments, the disk 22 is a two piece disk 22 comprised of the forward disk segment 26 and the aft disk segment 28 as shown in FIGS. 2 and 3. Both of these disk segments 26, 28 are designed with an attachment feature that is tapered being taller at the interface of the disk 22 and shorter at the outward facing edges of the disk 22. This style of attachment traps the turbine blade 24 between the two disk segments 26, 28 when they are assembled together. The disk 22 is also designed such that the rim of the disk 22 acts as the flowpath, replacing a platform on the turbine blade 24. This last function could be accomplished by either using the base disk material or lug made of a high temperature material being bonded to an outer diameter of the base disk 22. Other embodiments are envisioned where the blade includes a platform and the platform is not performed by the disk itself.

In other embodiments, a separable platform is used. The separable platform could be designed to be captured between the two disk segments, pinned in place or trapped between adjacent turbine blades 24. This separable platform could be made of a metallic alloy, a CMC or a monolithic ceramic. There are multiple ways that the disk segments 26, 28 could be held together including, but not limited to, a spline/tie bolt arrangement, bolts/nuts through the web of the disk, and cam lock features with a tie bolt.

If a cooled turbine blade 24 is desired, air can be fed up to the blade between the disk segments 26, 28. This may eliminate a front cover-plate (either full or rim) and its associated weight penalty. If additional pumping of the cooling air is desired to feed the blade, vanes could be added to the inner surface of one or both disk segments 26, 28 to perform this task.

Lastly, since air is being introduced between the disks, the bending in the disk that is typically caused by one the front side (typical for an HP1) being cooled may be eliminated. The two disk segments 26, 28 may be cooled on the inner surface causing them to lean toward one another due to thermals (CF effect not considered). One of the benefits of this design could be that it can be designed to put the blade attachment in compression and may eliminate any movement of the blade while the wheel is not rotating.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel for a gas turbine engine, the turbine wheel comprising
    a fore disk segment that includes a fore body arranged around an axis, a first fore lug that extends radially outward away from the fore body, and a second fore lug that extends radially outward away from the fore body and the first fore lug spaced apart circumferentially from the second fore lug to define an axially extending fore slot between the first fore lug and the second fore lug,
    an aft disk segment that includes an aft body arranged around the axis, a first aft lug that extends radially outward away from the aft body, and a second aft lug that extends radially outward away from the aft body and the first aft lug spaced apart circumferentially from the second aft lug to define an axially extending aft slot between the first aft lug and the second aft lug,
    a turbine blade comprising ceramic matrix composite materials, the turbine blade including a root located in the axially extending fore slot and the axially extending aft slot and an airfoil that extends radially outward away from the root,
    wherein the first fore lug, the second fore lug, the first aft lug, and the second aft lug are shaped to block axial, circumferential, and radial movement of the root of the turbine blade out of the axially extending fore slot and the axially extending aft slot,
    wherein the fore body includes a fore hub and a fore web that extends circumferentially around the fore hub, the aft body includes an aft hub and an aft web that extends circumferentially around the aft hub, the first fore lug includes an aft facing lug surface and the first aft lug includes a fore facing lug surface that is engaged with the aft facing lug surface face of the first fore lug,
    and wherein the turbine wheel further includes fasteners that extend through the fore hub and the aft hub to hold the fore hub and the aft hub in compression toward one another such that an axial size of a gap between the fore hub and the aft hub is reduced and to cause the aft facing lug surface and the fore facing lug surface to be urged into engagement together,
    wherein the first fore lug defines a first side surface that defines a first portion of the axially extending fore slot, and the second fore lug defines a second side surface that defines a second portion of the axially extending fore slot, and an inner radial surface that extends between and interconnects the first side surface and the second side surface, a radial distance of the inner radial surface relative to the axis remaining substantially unchanged as the inner radial surface extends axially, and
    the first side surface and the second side surface taper radially inward and circumferentially toward each other as the first side surface and the second side surface extend axially away from the aft disk segment,
    wherein the first side surface, the second side surface, and the inner radial surface engage the root and apply a compressive force around the root of the turbine blade when the fore hub and the aft hub are held in compression by the fasteners to block axial, radial, and circumferential movement of the root while the multi-piece disk is not rotating.

2. The turbine wheel of claim 1, wherein the axially extending fore slot extends axially through the entire fore disk segment.

3. The turbine wheel of claim 1, wherein the first aft lug includes a side surface that defines at least a portion of the axially extending aft slot and the side surface tapers at least one of radially and circumferentially as the side surface extends axially forward toward the fore disk segment.

4. The turbine wheel of claim 1, wherein the fore disk segment further includes a plurality of radially extending vanes that extend aft away from the fore web toward the aft disk segment.

5. The turbine wheel of claim 4, wherein the aft disk segment further includes a plurality of radially extending vanes that extend axially forward away from the aft web toward the fore disk segment.

6. The turbine wheel of claim 1, wherein the turbine wheel further includes a rigid annular spacer ring located axially between the fore hub and the aft hub.

7. The turbine wheel of claim 1, wherein the root of the turbine blade includes an attachment surface that tapers radially as the attachment surface extends axially.

8. The turbine wheel of claim 1, wherein the first fore lug, the second fore lug, the first aft lug, and the second aft lug include outer radial surfaces that extend around the airfoil of the turbine blade to provide a platform around the turbine blade.

9. The turbine wheel of claim 1, wherein the gap located between the fore hub and the aft hub provides a radial fluid path for air to flow between the fore disk segment and the aft disk segment.

10. A turbine wheel for a gas turbine engine, the turbine wheel comprising
a fore disk segment that includes a fore body arranged around an axis, a first fore lug that extends radially outward away from the fore body, and a second fore lug that extends radially outward away from the fore body and the first fore lug spaced apart circumferentially from the second fore lug to define an axially extending fore slot between the first fore lug and the second fore lug,
an aft disk segment that includes an aft body arranged around the axis, a first aft lug that extends radially outward away from the aft body, and a second aft lug that extends radially outward away from the aft body and the first aft lug spaced apart circumferentially from the second aft lug to define an axially extending aft slot between the first aft lug and the second aft lug,
a turbine blade comprising ceramic matrix composite materials, the turbine blade including a root located in the axially extending fore slot and the axially extending aft slot and an airfoil that extends radially outward away from the root,
wherein the first fore lug, the second fore lug, the first aft lug, and the second aft lug are formed to include tapered side surfaces that engage the root and apply compressive forces to the root of the turbine blade and block axial, circumferential, and radial movement of the root of the turbine blade out of the axially extending fore slot and the axially extending aft slot while the multi-piece disk is not rotating,
wherein the first fore lug is coupled with the fore body along a bond line to form a bond layer that extends axially and circumferentially relative to the axis, and is located radially between the first fore lug and the fore body.

11. A method comprising
providing a turbine blade and a multi-piece disk having a fore disk segment and an aft disk segment, the turbine blade including a root and an airfoil that extends outward away from the root, the fore disk segment formed to include a plurality of fore slots, and the aft disk segment formed to include a plurality of aft slots,
aligning the root of the turbine blade with a first fore slot included in the plurality of fore slots, wherein the fore disk segment includes a first fore side surface and a second fore side surface that define the first fore slot, and the first and second fore side surfaces taper radially inwardly and circumferentially toward each other as the first fore slot extends axially forward away from the aft disk segment,
moving the fore disk segment and the turbine blade axially relative to one another until the turbine blade is blocked from further axial movement by the fore disk segment to locate the root of the turbine blade in the first fore slot,
aligning the root of the turbine blade with a first aft slot included in the plurality of aft slots, wherein the aft disk segments includes a first aft side surface and a second aft side surface that define the first aft slot, the first and second aft side surfaces taper radially inwardly and circumferentially toward each other as the first aft slot extends axially aft away from the fore disk segment, and
moving the aft disk segment and the turbine blade axially relative to one another until the turbine blade is blocked from further axial movement by the aft disk segment to locate the root of the turbine blade in the first aft slot, and
applying a compressive force to the root of the turbine blade with the tapered first and second fore side surfaces of the fore disk segment and the tapered first and second aft side surfaces of the aft disk segment to block axial, radial, and circumferential movement of the root while the multi-piece disk is not rotating.

12. The method of claim 11, wherein the fore disk segment includes a fore hub arranged around an axis, a fore web arranged circumferentially around the fore hub, and a plurality of fore lugs that extends radially away from the fore web, the aft disk segment includes an aft hub arranged around the axis, an aft web arranged circumferentially around the aft hub, and a plurality of aft lugs that extends radially away from the aft web, and the method further includes pressing the fore hub and the aft hub axially to reduce a size of a gap between the fore hub and the aft hub while blocking axial movement of the plurality of fore lugs and the plurality of aft lugs.

13. The method of claim 12, further comprising blocking the fore hub and the aft hub from moving axially away from one another after pressing the fore hub and the aft hub.

14. The method of claim 11, wherein the fore disk segment includes a fore hub arranged around an axis and a fore web arranged circumferentially around the fore hub and the method further includes bonding a plurality of fore lugs to the fore web to define the plurality of fore slots.

15. The method of claim 11, wherein the fore disk segment includes a fore hub arranged around an axis, a fore web arranged circumferentially around the fore hub, and a plurality of fore lugs that extend radially away from the fore web, the fore web is formed to include a plurality of vanes that extend aft toward the aft disk segment, and the method further includes rotating the fore disk segment to cause the plurality of vanes to move air radially outward toward the turbine blade.

16. The method of claim 11, further comprising directing hot combustion gasses directly over outer radial surfaces of the fore disk segment and the aft disk segment.

17. The method of claim 11, further comprising locating a rigid spacer axially between the fore disk segment and the aft disk segment.

* * * * *